United States Patent [19]

Melling, Jr.

[11] Patent Number: 4,603,346
[45] Date of Patent: Jul. 29, 1986

[54] SUBCARRIER/HORIZONTAL SYNC PHASE MEASUREMENT

[75] Inventor: Laurent A. Melling, Jr., Scappoose, Oreg.

[73] Assignee: Tektronix, Inc., Beaverton, Oreg.

[21] Appl. No.: 498,793

[22] Filed: May 27, 1983

[51] Int. Cl.⁴ .......................................... H04N 17/02
[52] U.S. Cl. ............................................... 358/10
[58] Field of Search ........................................ 358/10

[56] References Cited
U.S. PATENT DOCUMENTS 4,470,064 9/1984 Michener .............................. 358/10

Primary Examiner—John W. Shepperd
Attorney, Agent, or Firm—John Smith-Hill; Francis I. Gray

[57] ABSTRACT

Signals suitable for displaying the phase relationship between the subcarrier wave and the horizontal sync pulse of a composite video signal are provided by establishing coincidence between the d.c. level of the 50 percent point of the sync pulse and the zero crossing point of the subcarrier wave, and generating a reference voltage level at the d.c. level of the 50 percent point of the sync pulse.

6 Claims, 5 Drawing Figures

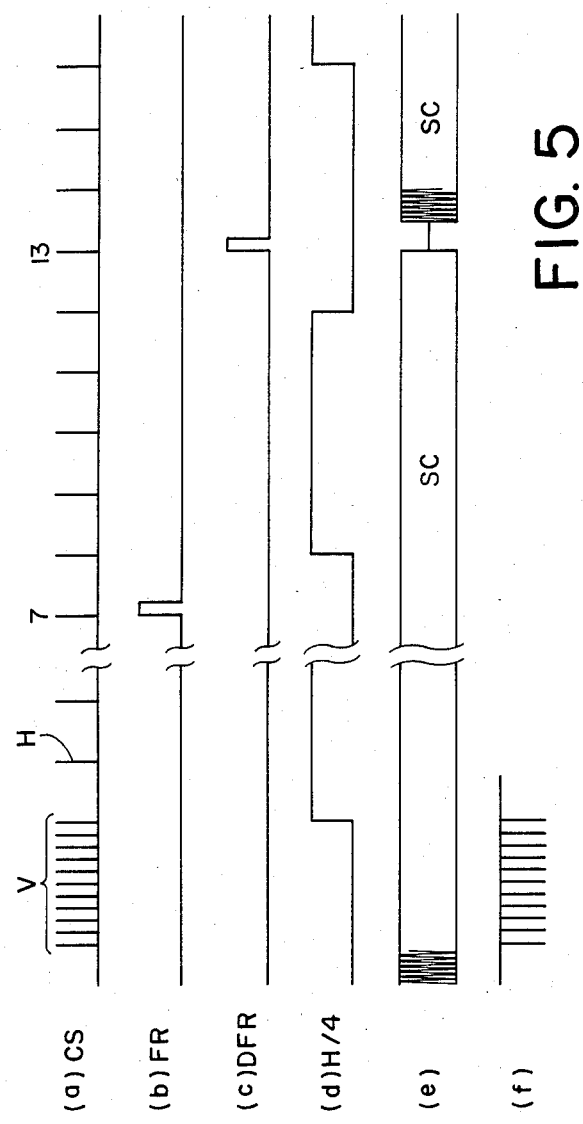

SUBCARRIER/HORIZONTAL SYNC PHASE MEASUREMENT

This invention relates to a method and device for providing signals suitable for displaying the phase relationship between the subcarrier wave and the horizontal sync pulse of a composite video signal.

BACKGROUND OF THE INVENTION

Three of the major color television systems at present in use are those known as the NTSC system, the PAL system and the PAL-M system. In each of these systems, each horizontal line of the TV signal comprises a negative-going sync pulse followed by the color burst, which is a sinusoidal signal. In the NTSC system, the phase of the color burst relative to horizontal sync is reversed on alternate lines, i.e., the phase changes by 180 degrees from line to line, whereas in the PAL system the phase of the color burst changes with respect to sync by a multiple of 90 degrees, plus 0.7 degrees per line. The additional 0.7 degrees corresponds to a frequency of 25 Hz. In PAL-M, the change is the same as in PAL, but omitting the additional 0.7 degrees. Thus, whereas in the NTSC system the sinusoidal form of the color burst can be seen when the signal is displayed on a waveform monitor at field rate, in the PAL system the 25 Hz offset results in a blur being seen in the burst interval, and in the PAL-M system multiple sine waves are seen, and therefore in both the latter systems it is necessary to view a selected line at a field rate in order to perceive the sinusoidal form of the burst.

In each of the three major systems, the color burst is said to be in phase with horizontal sync when the positive-going zero crossing of the extrapolated burst wave aligns with the 50 percent point of the leading edge of sync on line 1 of the composite signal. In the case of the NTSC system, this relationship applies to all odd-numbered lines owing to the reversal of phase of burst on alternate lines.

In a television studio, it is conventional to use a master sync generator to provide composite sync (horizontal and vertical sync information) and a continuous subcarrier wave at burst frequency to the cameras and other video signal sources in the studio. The cameras use the continuous subcarrier wave to generate the color burst. In order to ensure that the color burst is in phase with horizontal sync, the phase relationship between the sync information and the subcarrier wave is adjusted to bring the positive-going zero crossing of the subcarrier into alignment with the 50 percent point of the leading edge of sync. The phase difference between the continuous subcarrier wave and horizontal sync may be measured by overlaying subcarrier and sync on a dual trace oscilloscope and then adjusting the phase of sync to achieve the desired phase relationship. This, however, assumes that a dual trace oscilloscope is available for use, and this might not always be the case in a television studio. Moreover, the harmonics of the subcarrier tend to distort the sinusoidal form of the subcarrier wave. Further, the overlay technique is not usable with the PAL system owing to the progressive change in phase of subcarrier through the field. Conventional subcarrier to horizontal phase meters are not inherently accurate and are subject to drift, and therefore need to be calibrated repeatedly. Other devices purport to maintain correct phase relationship without providing a display, but certain of these devices are subject to inherent limitations, such as a need to set horizontal and vertical references and to use equalizing pulses.

SUMMARY OF THE INVENTION

According to one aspect of the present invention there is provided a method of providing signals suitable for displaying the phase relationship between the subcarrier wave and the horizontal sync pulse of a composite video signal, comprising establishing coincidence between the d.c. level of the 50 percent point of the sync pulse and the zero crossing point of the subcarrier wave, and generating a reference voltage level at the d.c. level of the 50 percent point of the sync pulse.

According to another aspect of the present invention there is provided a device for providing signals suitable for displaying the phase relationship between the subcarrier wave and the horizontal sync pulse of a composite video signal, comprising means for establishing coincidence between the d.c. level of the 50 percent point of the sync pulse and the zero crossing point of the subcarrier wave, and means for generating a reference voltage level at the d.c. level of the 50 percent point of the sync pulse.

BRIEF DESCRIPTION OF THE DRAWINGS

For a better understanding of the invention, and to show how the same may be carried into effect, reference will now be made, by way of example, to the accompanying drawings in which:

FIG. 5 shows the waveforms which occur at various points of the FIG. 4 device.

DETAILED DESCRIPTION

Figure 1:
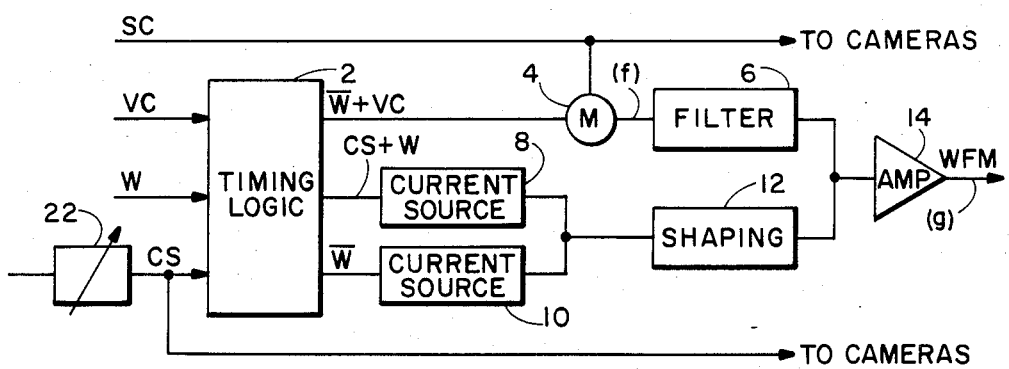
FIG. 1 is a block diagram of a device for generating a signal for displaying the phase relation of subcarrier and horizontal sync in the NTSC system.
Figure 2:
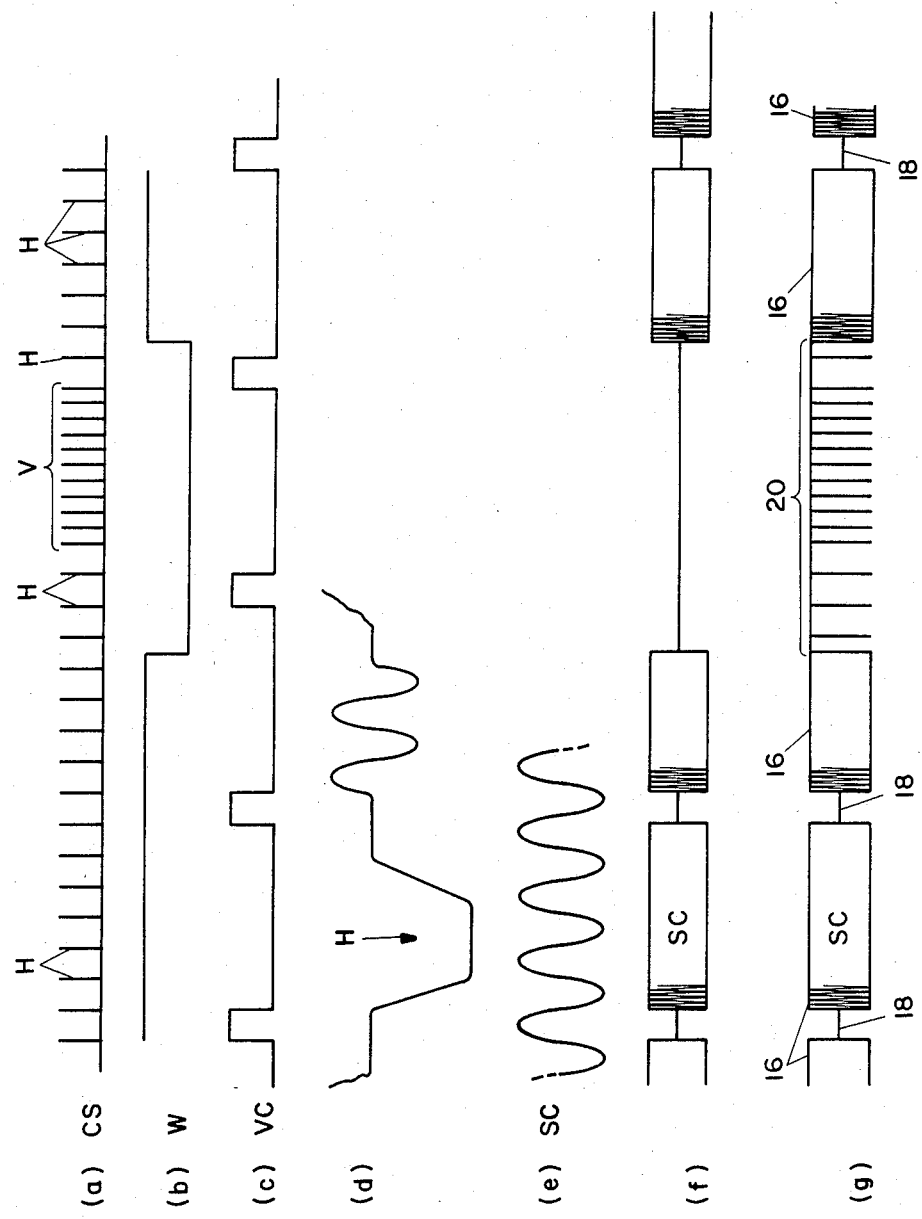
FIG. 2 shows the waveforms which occur at various points of the FIG. 1 device.

The circuit shown in FIG. 1 is used in conjunction with a master sync generator of a TV studio for calibrating subcarrier to horizontal sync phase in the NTSC system. The circuit comprises a timing logic circuit 2 which receives three input signals, namely vertical crosshatch, window and composite sync. The waveforms for these signals are shown in FIG. 2, it being noted that the time (horizontal) axis in FIGS. 2(d) and (e) is greatly enlarged with respect to that of FIGS. 2(a), (b), (c), (f) and (g).

The composite sync signal CS is shown in FIG. 2(a), and comprises horizontal sync pulses H and vertical sync information, represented collectively as V. FIG. 2(a) shows the timing of the pulses of the signal CS and does not purport to show the configuration of the waveform. The window pulse W is shown in FIG. 2(b), and its timing is such that the pulse W is present (window open) throughout the vertical sync interval. The vertical crosshatch VC is shown in FIG. 2(c), and comprises a succession of pulses at uniform intervals such that no pulse occurs during the vertical interval.

FIG. 2(d) shows the horizontal sync interval of one line of the video signal, including the horizontal sync pulse H and the color burst, while FIG. 2(e) shows the continuous wave subcarrier from which the color burst is generated.

The timing logic circuit 2 receives the signals VC, W and CS, and generates in known manner the signals $\overline{W}$+VC, CS+W and $\overline{W}$. The signal $\overline{W}$+VC is applied to a modulator 4 which receives the subcarrier wave SC at its modulating input and thus provides the signal shown in FIG. 2(f) at its output. A harmonic filter 6 is used to remove distortions due to harmonics of the subcarrier.

Figure 3:
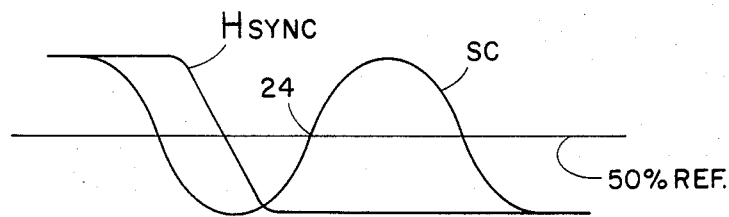
FIG. 3 shows the display that is provided on a waveform monitor by the FIG. 1 device.

The signals CS+W and $\overline{W}$ are applied to current sources 8 and 10 which are turned off when the respective input signals are high. The outputs of the current sources are applied to a shaping circuit 12, and the outputs of the shaping circuit and the harmonic filter are combined and applied to an output amplifier 14. The signal that is obtained at the output of the amplifier is as shown in FIG. 2(g). During the intervals 16, the signal corresponds to the subcarrier wave. The sinusoidal form of the signal cannot be seen because of the high frequency of the subcarrier wave. The subcarrier wave is gated out during the intervals 18 by the pulse VC. During the interval 20, corresponding to the pulse W, the signal represents composite sync. In the FIG. 2(g) waveform, the composite sync is inverted with respect to FIG. 2(a) owing to the operation of the current source 8. During the intervals 16 and 18, the d.c. level of the signal is shifted by the current sources 8 and 10 by 50 percent of the horizontal sync pulse amplitude and therefore, when the signal is viewed at line rate on a waveform monitor, the horizontally-magnified display in the area of the leading edge of sync is as shown in FIG. 3. Horizontal sync is brought into phase with the subcarrier by adjusting the phase shifter 22 so that the leading edge of the horizontal sync pulse for an odd-numbered line intersects the positive going edge of the subcarrier wave and the 50 percent reference level at the point 24. Subcarrier and phase-shifted sync are fed to the cameras of the studio for use in constructing the composite NTSC signal.

Figure 4:
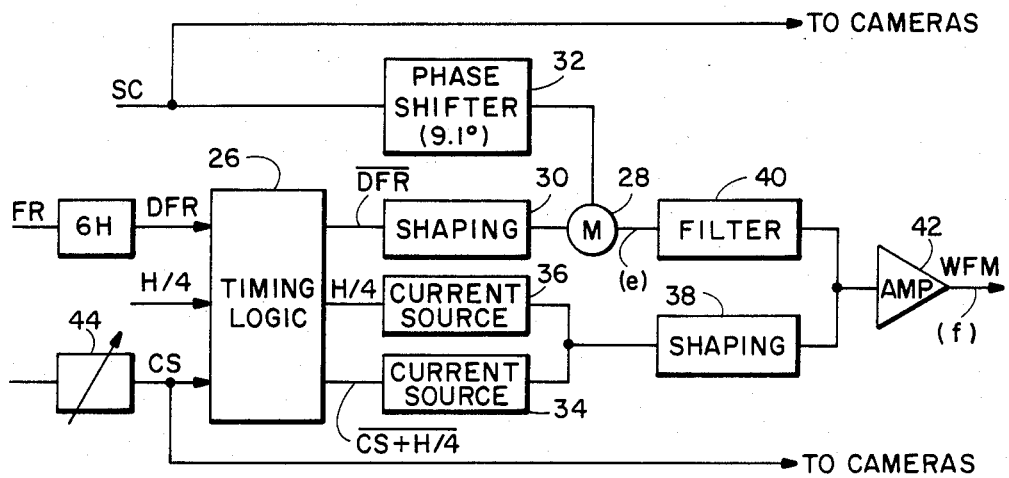
FIG. 4 is a block diagram of a device similar to FIG. 1 but suitable for use with a video signal conforming to the PAL system.

The display shown in FIG. 3 is obtainable from sync and subcarrier conforming to the PAL system using the circuit shown in FIG. 4, the waveforms for which are shown in FIG. 5. In the case of the PAL system, it is necessary to select a specific line of the TV signal for display. For convenience, line 13 is selected. It will be understood that burst will be in phase with horizontal sync if the positive-going zero crossing of subcarrier, delayed by 9.1 degrees (13×0.7 degrees), is aligned with the 50 percent point of the leading edge of sync.

Line 13 is selected by use of the field reference pulse FR (FIG. 5(c)) occurs on line 7 of the PAL signal, it is delayed by a period 6H (6 times the horizontal line duration) to generate a delayed field reference pulse DFR (FIG. 5(c)) occurring on line 13. A signal H/4 (FIG. 5(d)), i.e., a signal at one-fourth the horizontal line rate and having a 50 percent duty cycle, is also provided. The timing logic circuit 26 of FIG. 4 receives the signals DFR, H/4 and CS and generates signals $\overline{DFR}$, $\overline{CS+H/4}$ and H/4. The signal $\overline{DFR}$ is applied to a modulator 28 through a shaping circuit 30 and the continuous subcarrier wave SC is applied to the modulator through a phase shifter 32 which delays the subcarrier wave by 9.1 degrees. The signals $\overline{CS+H/4}$ and H/4 are applied to current sources 34 and 36 which are turned off when the respective input signals are high, and the outputs of the current sources are applied to a shaping circuit 38. The output (FIG. 5(e)) of the modulator 28 is passed through a harmonic filter 40, and the outputs of the circuit 38 and the filter 40 are combined and applied to an output amplifier 42. When the output signal (FIG. 5(f)) from the amplifier 42 is applied to a waveform monitor operating at field rate, and line 13 is selected for display, the display is as shown in FIG. 3. A phase shifter 44 is used to shift the phase of composite sync in order to achieve the desired phase relationship with subcarrier.

It will be appreciated that the invention is not restricted to the particular methods and apparatus which have been described and illustrated, since variations may be made therein without departing from the scope of the invention as defined in the appended claims, and eqivalents thereof. For example, although the FIG. 1 circuit operates by shifting the sync pulse and the 50 percent reference level up by 50 percent of the sync amplitude, to the blanking level, it would alternatively be possible to shift the subcarrier wave down by 50 percent of the sync amplitude. The circuits of FIGS. 1 and 4 are shown in block form, because the various components thereof are of well-known design. The invention is applicable to the PAL-M system by appropriate selection of the input signals and the operations performed by the timing logic circuit.

I claim:

1. A method for providing proper phase relationship between the subcarrier wave and the horizontal sync pulse of a composite video signal, comprising establishing coincidence between the d.c. level of the 50 percent point of the sync pulse and the zero crossing point of the subcarrier wave, and generating a reference voltage level at the d.c. level of the 50 percent point of the sync pulse.

2. A method according to claim 1, wherein the reference voltage level is generated from the subcarrier wave by gating out the subcarrier wave.

3. A method according to claim 1, wherein coincidence is established by shifting the d.c. level of the 50 percent point of the sync pulse by 50 percent of the amplitude of the sync pulse, and the reference voltage level is generated from the subcarrier wave by gating out the subcarrier wave.

4. A device for providing proper phase relationship between the subcarrier wave and the horizontal sync pulse of a composite video signal, comprising means for establishing coincidence between the d.c. level of the 50 percent point of the sync pulse and the zero crossing point of the subcarrier wave, and means for generating a reference voltage level at the d.c. level of the 50 percent point of the sync pulse.

5. A device for providing signals suitable for displaying the phase relationship between a subcarrier wave and the horizontal sync pulses of a composite sync signal having both horizontal and vertical sync pulses comprising:

means for gating the subcarrier wave during that portion of the composite sync signal excluding the vertical sync pulses; and means for combining the gated subcarrier wave with the composite sync signal such that the d.c. level of the gated subcarrier wave is at the 50 percent point of the horizontal sync pulses.

6. A device as recited in claim 5 further comprising means for shifting the phase of the composite sync signal with respect to the subcarrier so that the combination of the composite sync signal with the gated subcarrier wave produces a specified color standard television system.

* * * * *